(No Model.)
P. CAMMERBEKE.
LAWN MOWER.
No. 465,160.
Patented Dec. 15, 1891.
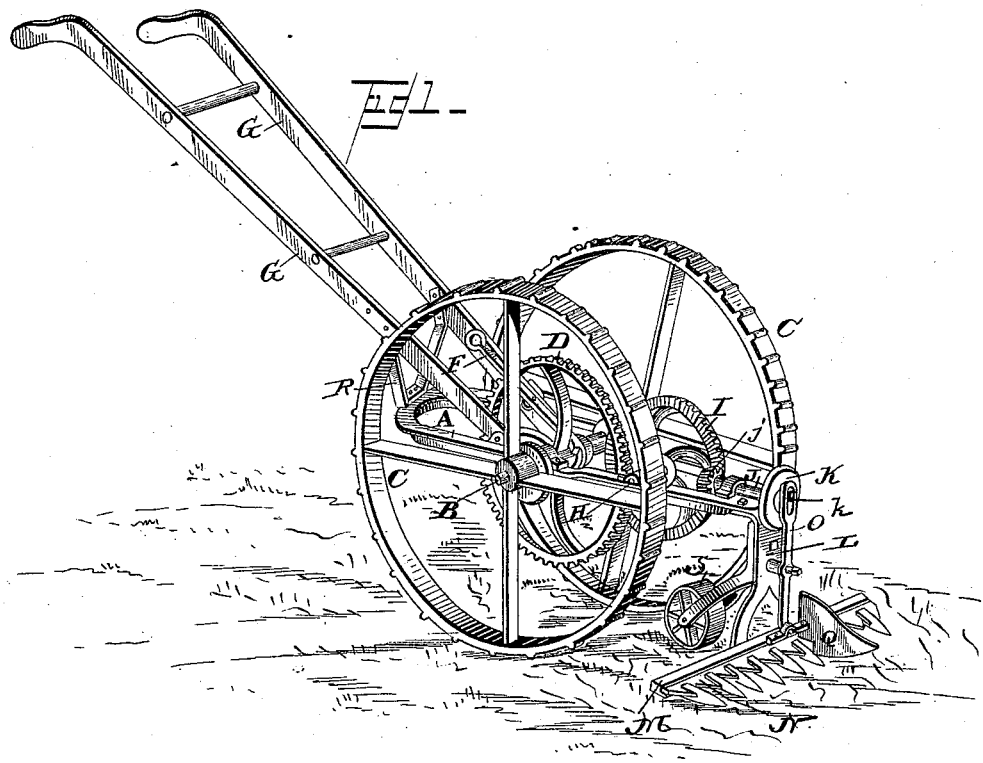
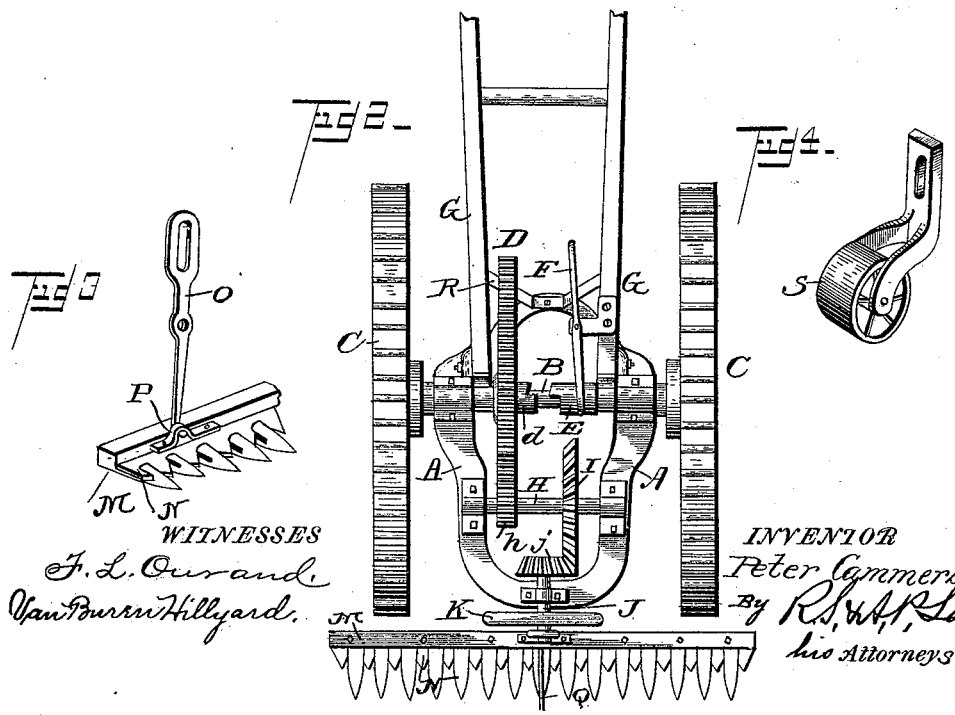

UNITED STATES PATENT OFFICE.

PETER CAMMERBEKE, OF GREELEY, KANSAS.

LAWN-MOWER.

SPECIFICATION forming part of Letters Patent No. 465,160, dated December 15, 1891.

Application filed January 2, 1891. Serial No. 376,509. (No model.)

*To all whom it may concern:*

Be it known that I, PETER CAMMERBEKE, a citizen of the United States, residing at Greeley, in the county of Anderson and State of Kansas, have invented certain new and useful Improvements in Mowers; and I do hereby declare the following to be a full, clear, and exact description of the invention, such as will enable others skilled in the art to which it appertains to make and use the same.

This invention relates to mowers for trimming lawns and cutting grass generally.

The object of the invention is to apply the power direct to the moving sickle-bar and at the lowest point possible and have the frame which supports the driving mechanism occupy a practically horizontal plane.

The improvement consists of the novel features, which hereinafter will be more fully described and claimed, and which are shown in the accompanying drawings, in which—

Figure 1 is a perspective view of a machine embodying my invention. Fig. 2 is a top plan view of the machine. Fig. 3 is a detail view of the lever which is between the crank-shaft and the cutter-bar, showing the manner of connecting the same with the said cutter-bar. Fig. 4 is a detail view of the caster, showing the manner of adjustably connecting it with the frame.

The frame A is preferably made of angle or T iron and is approximately triangular-shaped, the large or base end being toward the rear. The axle B is journaled on the frame, and is provided at its ends with the drive-wheels C C. The gear-wheel D is mounted on the axle and is free to turn thereon, and is provided on one side with a half-clutch $d$. A corresponding half-clutch E is mounted on the axle and is held thereon by a feather and spline, and is moved to and from the half-clutch $d$ by the shipper-lever F, which is pivoted between its ends to a bracket, which is secured to one of the handles G. The shaft H, parallel with the axle and journaled at its ends to the frame, is provided with the crown gear-wheel I and the pinion $h$, the latter meshing with the gear-wheel D. The shaft J, journaled on the front end of the frame, is provided at its inner end with the pinion $j$, which is in mesh with the crown gear-wheel I and at its outer end with the crank-wheel K, which is sufficiently large and heavy to form a balance-wheel. The X-shaped frame L is vertically disposed and secured at its upper ends to the front end of the frame A and at its lower end to the finger-bar M, on which the cutter-bar N is placed and operates. The lever O, slotted at its upper end and having its lower end bent, is mounted on a stand projecting from the frame L and has its upper or slotted end fitted over the crank-pin $k$, which projects from the crank-wheel, and its lower bent end inserted in the space formed by the upwardly-deflected portion of the strap-iron P, which is secured to the cutter-bar. The divider and guard Q is slipped on a guard-finger and projects up in front of the lever O and prevents the grass crowding thereon. The handles G G are secured at their lower ends to the frame and are strengthened and further connected with the frame a short distance from their lower ends by the V-brace R.

The caster S is vertically adjustable to regulate the height of the cut from the ground, having its standard slotted and secured to the frame L by a bolt which passes through the slot in the said standard.

The machine is designed to be pushed over the field or lawn, and when the half-clutches $d$ and E are in gear the cutter-bar will be reciprocated over the finger-bar by the mechanism hereinbefore described and will cut the grass. Obviously, when the clutches $d$ and E are unshipped, the cutter-bar will remain motionless. By adjusting the caster the cutting apparatus will be elevated a greater or less distance from the ground to cut the grass the required height.

Having thus described my invention, what I claim, and desire to secure by Letters Patent, is—

A lawn-mower composed of the horizontal frame A, mounted on axle B and wheels C, the vertical frame L, secured at its upper end to the frame A, the gear-wheel D, mounted on axle B and having half-clutch $d$, the clutch-sleeve E, held on the axle by feather and spline, the lever F for moving clutch-sleeve E to and from the half-clutch $d$, the shaft H, the pinion $h$, and bevel gear-wheel I, mounted on shaft H, the shaft J, having bevel-pinion $j$ and the crank K, the finger-bar M, secured to the lower end of the vertical frame L, the cutter-bar N, having the looped strap-iron P, the vertical lever O, pivoted midway of its ends to the frame L, and having its upper end slotted and fitted on the crank and having its lower end bent out and inserted in the loop of the strap-iron P, and the guard Q, located directly in front of the lever O and fitted on one of the guard-fingers, substantially as and for the purpose described.

In testimony whereof I affix my signature in presence of two witnesses.

PETER CAMMERBEKE.

Witnesses:
J. B. CORLEY,
J. C. WIDEMAN.